INVENTOR.
JOSEPH LICHTENSTEIN.
BY
ATTORNEYS.

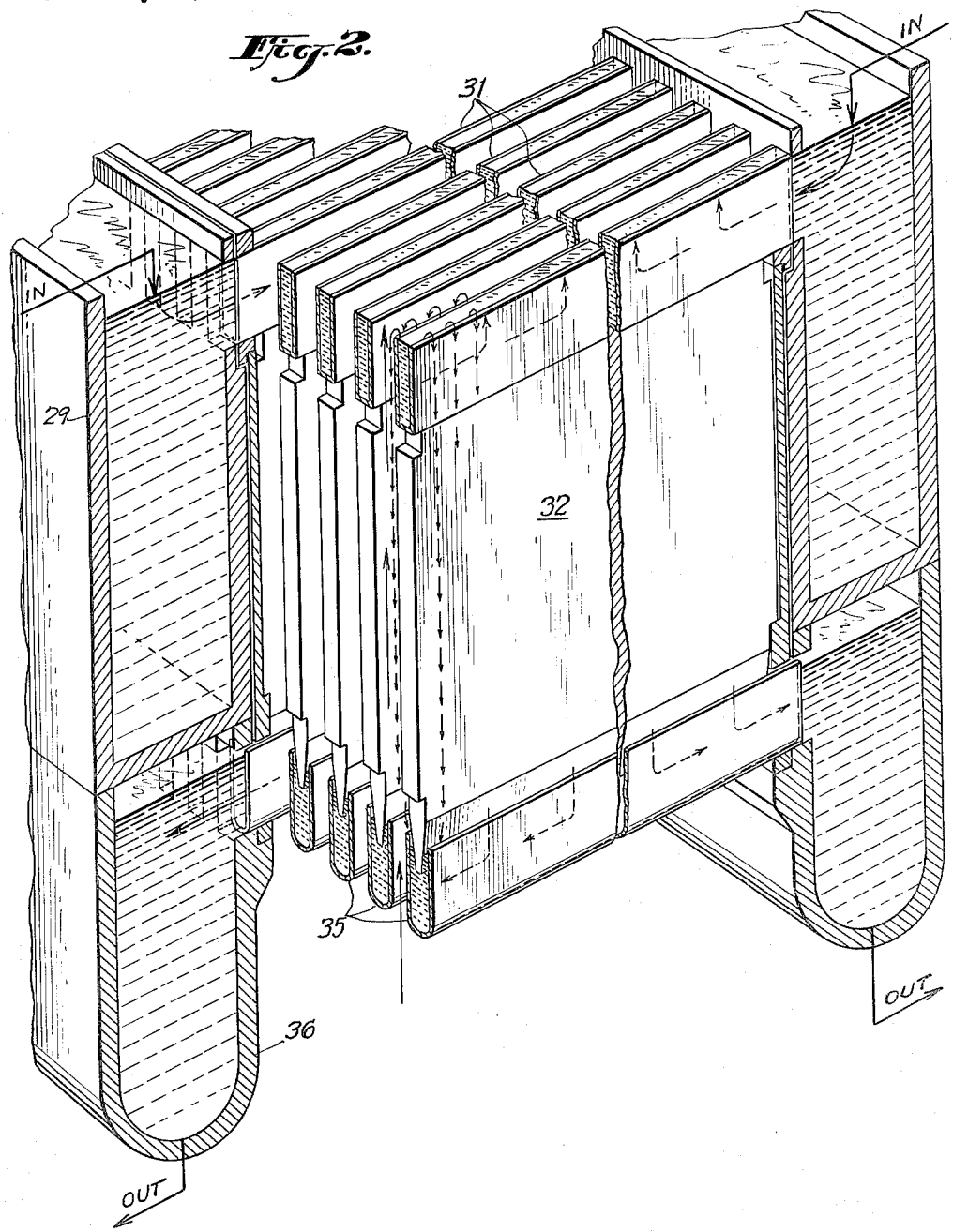

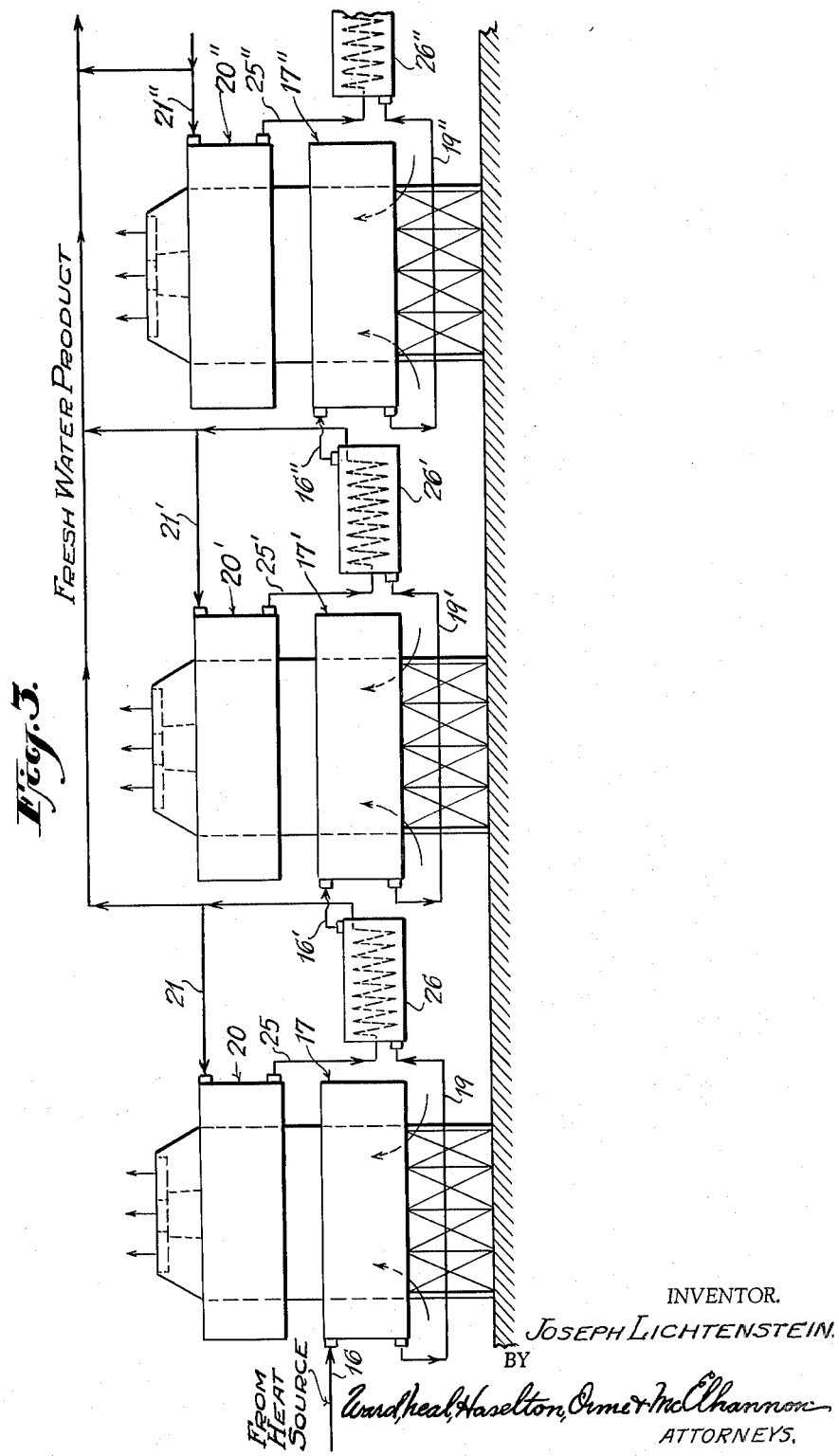

United States Patent Office 3,214,348
Patented Oct. 26, 1965

3,214,348
SALINE WATER CONVERSION
Joseph Lichtenstein, Bayside, N.Y., assignor, by mesne assignments, to Saline Water Conversion Corporation, a corporation of New York
Filed May 12, 1961, Ser. No. 109,648
8 Claims. (Cl. 202—47)

This invention relates to saline water conversion, and more particularly, to a system embodying a method and apparatus for extracting potable fresh water from sea or brackish water.

Systems of this class have been known in the art and much effort has been expended in the development of various constructions for effecting economical conversion of saline water to fresh water. Thus, it is known to flash vaporize heated saline water to separate steam from the water and then to condense the steam to fresh water. Other efforts were directed towards systems wherein air or other gas is brought into contact with water in a bubble tower to effect evaporation of some of the water into the air or gas. A condenser is then utilized to effect condensation of fresh water out of the air or gas.

The use of either of these known systems presents some very considerable problems. For example, in the flash vaporization system, water is heated under pressure and then moved to a low pressure zone to effect vaporization; and in the tower system, a relatively high pressure drop is required across the tower to effect an adequate degree of evaporation of moisture into the gas or air. The provision of equipment for effecting the required pressures necessitates relatively high initial and operating costs. Thus, these systems are feasible only on a small scale and neither of them is economically practicable for commercial application.

I have conceived a novel system that enables me to convert saline water, that is sea or brackish water, to potable fresh water without the need for either flash vaporization or bubble tower equipment, and in fact, without the need of high pressure heads thus considerably reducing the costs of systems involving such equipment. On the contrary, the system of the present invention involves a relatively small first cost and substantially reduced operating and maintenance costs. Additionally, the present system takes advantage of the unlimited supply of atmospheric air in a manner that will subsequently be made clear.

In essence, my invention resides in a method and apparatus wherein the saline water to be converted is heated to a temperature above the wet bulb temperature of the ambient atmosphere and is then brought into direct heat exchange contact with atmospheric air thus to effect humidification of the air. The air thus humidified is then brought into heat exchange contact with relatively cool fresh water to lower the temperature of the air thus to effect dehumidification thereof, and the fresh water so extracted from the humidified air is collected.

As a feature of my invention, I effect humidification of the heated saline water by bringing a thin film of the water having a large surface area into intimate contact with moving air at atmospheric pressure and temperature. For this purpose I prefer to utilize a cooling tower of the type shown and described in United States Letters Patent No. 2,760,764, for example. By such means the ambient atmosphere is brought into counterflow contact with the water film and, due to its low partial pressure and the relative temperatures of the water and air, becomes humidified to the point of saturation.

As a further feature of the invention, I then move the saturated air through a second similar tower wherein a film of relatively cool fresh water is brought into intimate contact with the heated, saturated air, under atmospheric conditions. Thus, as the temperature of the saturated air is lowered, dehumidification occurs and moisture is extracted from the air in the form of fresh water. Naturally, the dehumidification occurs at the film surface of the cool fresh water introduced into the tower so that the volume of fresh water is actually increased as it moves through the tower. The net increase in fresh water represents the product of the system and may be taken off at a convenient point.

It will be appreciated by those persons skilled in the art that adiabatic humidification and dehumidification of the atmospheric air occurs as the air moves through the towers, the necessary heat exchange taking place between the heated saline water and atmospheric air in the first instance, and between the cool fresh water and saturated air in the second. Accordingly, it is only necessary to supply energy to heat the saline water, operate a fan for moving atmospheric air through the towers, and pump the saline and fresh water. In this connection, it will be noted that the pumping heads for towers of the type mentioned, and consequently the power requirement for pumping, is relatively small.

Another aspect of the invention resides in the fact that the present system may ideally constitute an extension of existing steam power plants. Thus, the saline water may be used as the condensing medium for the steam turbine exhaust of such a plant, for example, to raise the temperature of the water while condensing the steam. There is no appreciable effect on the efficiency of the power plant itself, since the condenser heat load is normally rejected anyway, and any effect at all will only be felt during periods when the system is actually making water.

Since the greatest efficiency will be achieved in direct proportion to the difference between the atmospheric wet bulb temperature and the temperature to which the saline water is heated, it is desirable to heat the water to as high a temperature as possible so that it will release as much moisture as possible in the first tower to saturate the ambient air; although, in accordance with the present concept, the water temperature never reaches the boiling point as the system operates under atmospheric conditions. Then too, dehumidification will occur in the second tower in proportion to the difference in temperature between the cooling fresh water and the saturated air. Thus, the supply of fresh water may be cooled, and for this purpose I prefer to bring the fresh water into heat exchange relation with saline water to cool the fresh water before it is delivered to the second tower. A quantity of saline water may be taken from the source for this purpose in addition to that used in the first tower.

A further important aspect of the invention is based upon the realization that as in all such processes, theoretically at least, the heat of humidification is fully recoverable during dehumidification and is thus available to effect further humidification so that the present concept theoretically lends itself to multi-stage application in an infinite series of stages. However, as a practical matter, due to inherent heat losses, the series must be terminated where dictated by economical considerations. Thus, although the heat load may be preserved from stage to stage, the humidification-dehumidification cycle must take place in each successive stage at lower temperatures and partial pressures until further stages would detract from the economy of the system. That is, both humidification and dehumidification take place in each stage at constant temperature and partial pressure, but with successive heat losses to the atmosphere and correspondingly decreasing quantities of net product.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein:

FIG. 2 is a perspective view, partly broken away, illustrating the structure and operation of the towers; and FIG. 3 is a schematic representation of a multi-stage system according to the present concept.

Figure 1:
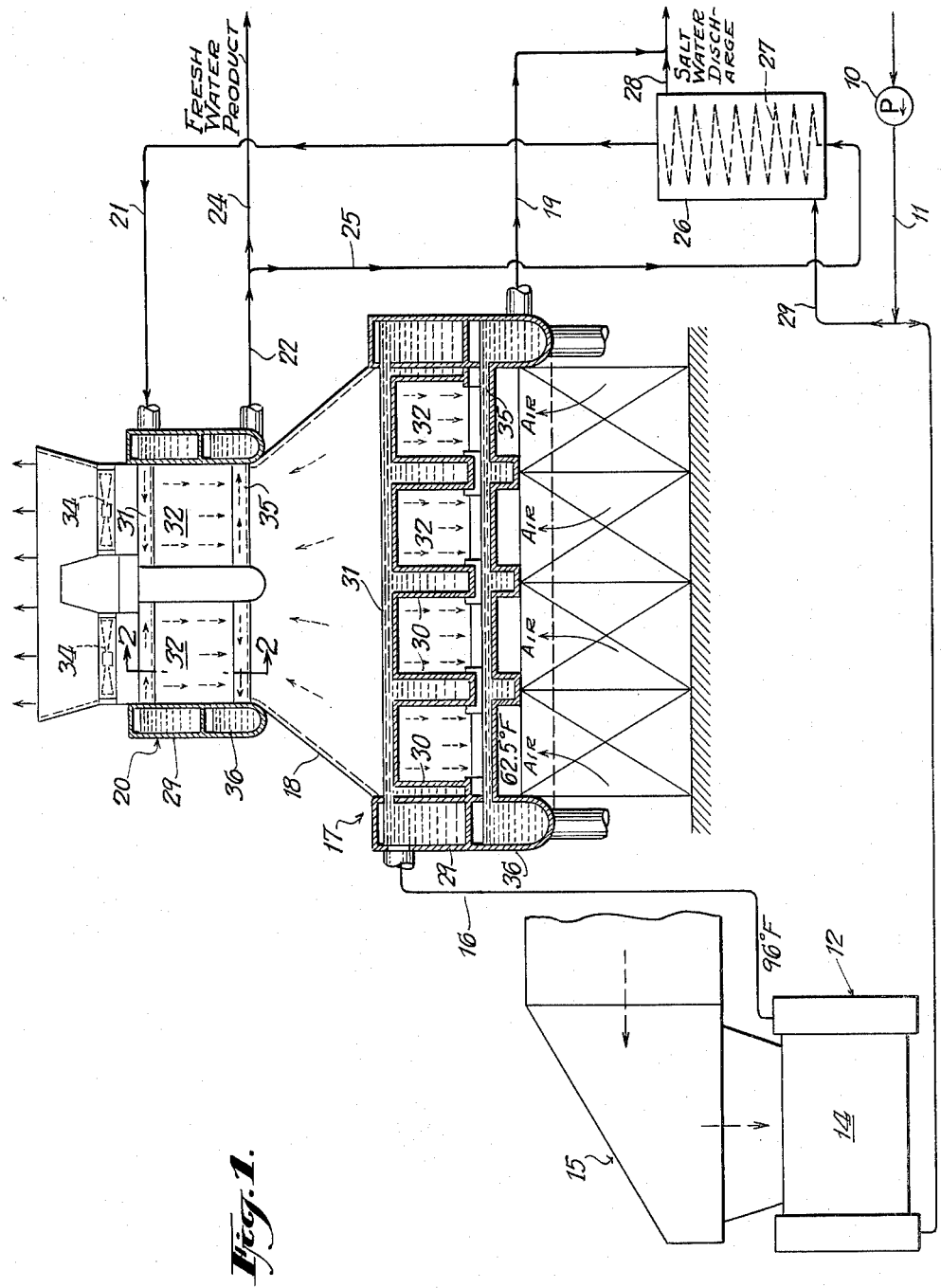
FIG. 1 is a schematic view of a system in accordance with the present invention.

Referring now to the drawings, and more particularly to FIG. 1 thereof, there is shown a system in accordance with the present invention wherein sea or brackish water, for example, is pumped from a convenient source by means of a pump 10 through an intake pipe 11 to a heat source 12 for raising the temperature of the water. In the embodiment shown, I have chosen to illustrate the heat source as a steam condenser 14 for condensing exhaust steam from a turbine 15 constituting a portion of a conventional steam power plant, although it will be understood that any suitable type of heat source may be utilized, it being my intention here to emphasize the facility with which the present system may be integrated with existing or proposed power plants to utilize the condenser heat load which is otherwise normally wasted.

After having its temperature raised by the heat source, the saline water passes through pipe 16 to a first cooling tower, indicated generally by the reference numeral 17, in accordance with the aforementioned U.S. Letters Patent, where it is disposed in thin film attitude and comes into surface contact with atmospheric air moving in counterflow with the water. By reason of its contact with the water film, the air becomes saturated with moisture in a manner to be described hereinafter, and the saline water leaves the tower 17 through pipe 19 and is discharged to its source.

A second cooling tower 20 is superposed above the tower 17 and is similar in all respects except that, as shown in FIG. 1, it may be somewhat smaller. A frusto-conical duct 18 extends between the top of the lower tower and the bottom of the upper tower, and the saturated air leaving the tower 17 moves up through the duct 18 and through the tower 20, as indicated by the arrows, but in this case, fresh water is disposed in film attitude for surface contact with the saturated air to cool same and effect dehumidification thereof. The fresh water enters the tower through pipe 21 and leaves through pipe 22, the net increase in the fresh water by reason of the dehumidification of the saturated air constituting the product of the system and being tapped off pipe 22 through a further pipe 24. The remainder of the fresh water is delivered through pipe 25 to a heat exchange unit 26 wherein it is cooled by saline water tapped off the saline water line 11 by a pipe 29 and run through the exchanger to a saline water discharge pipe 28 which joins the main saline discharge pipe 19. The fresh water is delivered to the exchanger coil 27 and after being thus cooled, is ready for recirculation to the tower 20. Under some atmospheric conditions, a fresh water to air heat exchanger or cooling tower may be used to cool the fresh water, instead of the fresh to saline water heat exchanger shown.

Referring now to FIGS. 1 and 2, the towers 17 and 20 may, for example, have closed, endless main troughs 29, intermediate troughs 30 and closely spaced distributing channels 31. The main troughs of the lower and upper towers receive water which flows to the intermediate troughs and the distributing channels from which it overflows and runs down along the sides thereof and down the sides of the film plates 32 therebeneath, thus being presented to the spaces between the channels in thin film disposition.

The towers are equipped with air moving means shown as fans 34 which draw atmospheric air from beneath the towers up through the air spaces between the film plates in the lower tower 17 and thence through the duct 18 and between the film plates in the upper tower 20 so that in each case it contacts a large surface of the water film moving on the plates in counterflow with the air.

Each tower has collecting troughs 35 positioned one each beneath and coextensive with the film plates for collecting the water that reaches the lower region of the respective plates. These collecting troughs are in fluid flow communication with return troughs 36 which are in turn connected with return pipes 19 and 22, respectively.

A more detailed description of the construction and operation of the cooling towers will, of course, be found in the aforementioned patent, but I have here presented the foregoing brief description thereof to assist in an understanding of my present concept.

In operation, the water to be converted is pumped from its source through the line 11 to a heat source such as the condenser 14, where it is heated to a temperature well above the wet bulb temperature of the ambient atmosphere. It next flows through the pipe 16 to the first or lower tower 17 where it is disposed in thin film attitude and brought into direct heat exchange contact with atmospheric air moving in counterflow relation to it. It will be understood by those persons skilled in the art that at the very area of contact, water vapor separates from the warm water and humidifies the air, thus increasing the partial pressure of that portion of the air in intimate contact with the water until it becomes saturated. Because the air further removed from the water is low in vapor and has a relatively low partial pressure, the saturated portion of air at high partial pressure begins to diffuse moisture vapor into the air at the lower partial pressure. This process continues until, upon leaving the first tower, the air is substantially saturated, or at one hundred percent relative humidity.

The heated saline water that is not carried off by the air as humidity reaches the return trough 36 of the lower tower 17 in the manner described and is returned to its source through the pipe 19.

The humidified air, upon leaving the lower tower, is drawn upwardly through the duct 18 and passes between the film plates 32 of the upper tower 20. As mentioned, these film plates serve to present thin films of cool fresh water to the air. It will be appreciated that the very region of surface contact of the air and water, the saturated air is cooled and, while its relative humidity remains constant at substantially one hundred percent, its absolute humidity drops as moisture condenses on the surface of the cool water. This, in turn, effects a reduced partial pressure of the air at the contact region and the moisture in the air commences to diffuse towards the contact region and as it is cooled, converts to fresh water and runs down the film plates along with the circulating fresh water. The moisture thus released as fresh water joins the fresh water being circulated through the tower thus to increase its volume. As mentioned before, the fresh water moves to the fresh water return trough 36 and out through pipe 22, the net increase being tapped off through pipe 24, and the remainder being recirculated through the heat exchange unit 26 and back to the tower 20.

By way of example, assuming a temperature of saline water of 65° F. and a wet bulb temperature of the atmosphere of 62.5° F., if a steam condenser is utilized as the heat source, it may be assumed that the condenser vacuum is 2 in. Hg corresponding approximately to a saturation temperature of 101° F. The saline water may very well leave the condenser at 96° F., and the air moving through the lower tower 17 may then cool the saline water to a 10° F. approach to the wet bulb temperature, is itself heated and absorbs moisture, leaving the lower tower saturated and at say 91° F. Incidentally, the discharge of the cooled saline water carrying its constituents with it eliminates the problem of scaling as found in flash vaporization systems.

The cool fresh water may arrive at the second tower at 70° F. to be heated by the saturated air to 86° F., for example, the air cooling to 75° F. saturated, while its excess water condenses on the fresh water film surfaces, as explained. The fresh water product is taken off to storage through pipe 24 while the air is discharged back to atmosphere.

Referring now to the multi-stage embodiment of the invention as shown in FIG. 3, a plurality of double tower assemblies are utilized, each comprising towers identical with towers 17 and 20, as in FIG. 1 but numbered 17' and 20' to indicate the second stage and 17" and 20" to indicate the third stage. All other reference numerals are similarly marked according to stage.

By way of an example of the operation of the embodiment of FIG. 3, it may be assumed that sea water at 55° F. is heated to 95° F. in a steam condenser with a vacuum of 2 in. Hg corresponding approximately to a saturation temperature of 101° F. This heated saline water then enters the cooling tower 17 in the manner described and flows downward in direct contact with upwardly flowing atmospheric air, having a wet bulb temperature say of 55° F., thus transferring its heat load to the air by humidifying it to saturation and itself cooling to about the atmospheric wet bulb temperature or 55° F. The hot humid air enters tower 20 and comes into direct contact with a downwardly flowing reflux fresh water stream at say 58° F. to which it transfers its heat load and upon the surface of which surplus moisture in the saturated air condenses while raising the fresh water temperature to about 90° F. The air leaves the tower 20 at a temperature close to the atmospheric wet bulb temperature, all as explained in connection with FIG. 1.

To continue the process in a multi-stage application, the heated reflux water (90° F.) is led to the heat exchanger 26 by the pipe 25 where it is cooled by the cold saline water (55° F.) leaving the tower 17 by the pipe 19 and which thus absorbs the heat load of the fresh water. After deducting the first stage product water which, in this embodiment is passed through the heat exchanger to provide the maximum heat load for the saline water, the cooled reflux water (58° F.) is returned by means of pipe 21 to the tower 20.

The saline water may, for example, reach a temperature of 87° F. in the exchanger 26 and then enters the tower 17' through pipe 16' and the process of humidifying atmospheric air in this tower and dehumidifying it in tower 20' is repeated. The saline water is again cooled in tower 17' to 55° F. while saturated air at 84.5° F. enters tower 20' for contact with fresh reflux water at 58° F. heating the water to 82° F. Again the fresh water thus heated in tower 20' is conducted by pipe 25' to heat exchanger 26' where it transfers its heat load to the cooled saline water entering the exchanger from tower 17' by means of pipe 19'. The fresh water is recirculated through the pipe 21', from which the net product of the second stage is tapped off, to the tower 20', while the saline water is heated to 79° F. in the exchanger 26' and passes through pipe 16" to the tower 17" of the third stage.

The saline water thus entering tower 17" is again cooled to 55° F. while saturating atmospheric air at 76.5° F. This air is then brought into contact with fresh reflux water at 58° F. in tower 20" thereby raising the fresh water temperature to about 74° F. while again increasing the fresh water product. The process continues through as many stages as are economically possible.

In practice, the heat load absorbed by the saline water in the heat exchanger 26 for the respective stages will be smaller than the heat load in the saline water entering the tower 17, for that stage due to heat discharge from tower 20 with the air. Consequently, the quantity of fresh water produced in the second stage is less than in the first and will be less in subsequent stages.

Economic considerations will determine the optimum number of stages, depending upon whether the original heat load is charged to the process or free of charge as where a condenser heat load is employed, for example, and also depending upon the equipment cost per stage.

For a specific installation where the economic factors are known for the power plant, if one is used as the heat source, where the value of fresh water is established and where environmental conditions such as wet bulb temperature and circulating water temperature are determined, an engineering optimization will enable those skilled in the are to arrive at values, such as those previously assumed, which will lead to the most economic plant. By standard methods of calculation, the size and cost of the equipment requirements and the value of the extra power requirements will permit the determination of the final cost of the fresh water produced by my process for a specific installation.

From the foregoing description it will be seen that I have conceived a novel system of converting saline water to potable fresh water without the need of either flash vaporization or bubble tower equipment, and in fact, without the need of high pressure heads. I have thus considerably reduced the cost of conversion systems by providing a system involving a relatively small first cost and substantially reduced operating and maintenance costs. It will also be appreciated that my novel system takes advantage of the unlimited supply of atmospheric air, which is humidified and dehumidified under atmospheric conditions.

It believe that the construction and operation of my novel conversion system will now be understood, and that the advantages of my invention will be fully appreciated by those persons skilled in the art.

I now claim:

1. A method of converting saline water to fresh water comprising: heating the saline water to be converted to a temperature above the wet bulb temperature of the atmosphere, disposing said heated saline water in downwardly flowing thin film attitude bringing atmospheric air into direct counterflow heat exchange contact with the heated water thus to effect humidification of the air at atmospheric pressure, maintaining a supply of fresh water, bringing the fresh water into heat exchange relation with unheated saline water to lower the temperature of the fresh water to a value substantially below that of the humidified atmospheric air, disposing said fresh water in flowing thin film attitude and bringing the humidified air into direct counterflow heat exchange contact with the cooled fresh water to lower the temperature of the humidified atmospheric air thus to effect dehumidification thereof to increase the volume of the fresh water.

2. A method of converting saline water to fresh water comprising: heating the saline water to be converted to a temperature above the wet bulb temperature of the ambient atmosphere, disposing said heated saline water in flowing film attitude, bringing ambient air into direct counterflow surface contact with the water film under atmospheric conditions to effect humidification of the air to the point of substantial saturation, maintaining a supply of fresh water at a temperature below that of the humidified air, disposing the fresh water in flowing film attitude, bringing the humidified air into direct counterflow contact with the fresh water film under atmospheric conditions to cool the air and effect dehumidification thereof to increase the volume of the fresh water.

3. A method of converting saline water to fresh water comprising: heating the saline water to be converted, bringing the water thus heated into direct heat exchange contact with atmospheric air having a wet bulb temperature lower than the temperature of the heated water thus to increase the humidity of the air while lowering the temperature of the saline water, bringing the air thus humidified into direct heat exchange contact with relatively cool fresh water in a zone thus lowering the temperature of such air to effect dehumidification thereof while raising the fresh water temperature, bringing the fresh and saline water into heat exchange relation to increase the temperature of the saline water and lower the temperature of the fresh water, collecting the fresh water product, recirculating the fresh water thus cooled for further direct heat exchange contact with humidified air, and utilizing the saline water thus heated by the fresh water to effect humidification of atmospheric air in a further direct contact zone.

4. In a multi-stage system of the class described, a first stage including means heating saline water to be converted to fresh water to a temperature above the wet bulb temperature of the ambient atmosphere, means conveying the heated saline water and atmospheric air into direct heat exchange relation to effect evaporation under atmospheric conditions of moisture from said water into said atmosphere while lowering the temperature of the saline water, a supply of fresh water, means conveying fresh water from said supply into direct heat exchange relation with said moisture laden atmospheric air to induce condensation of the moisture from the moisture laden air also under atmospheric conditions while raising the temperature of the fresh water, means bringing the thus warmed fresh and saline water into heat exchange relation to raise the temperature of the saline water while lowering that of the fresh water, means recirculating the cooled fresh water to the first stage moisture laden air, a further stage similar to said first stage, and means conveying the saline water heated by the first stage fresh water to heat exchange relation with atmospheric air in said further stage.

5. In a system of the class described, means heating saline water to be converted to fresh water to a temperature above the wet bulb temperature of the ambient atmosphere, a first cooling tower, means associated with said tower providing a flowing film surface of fluid to be cooled, means conveying the heated saline water to said cooling tower to be disposed in flowing film attitude, means moving atmospheric air into counterflow surface contact with the film surface of water to cool same while effecting humidification of said atmospheric air, a second tower similar to the first and positioned directly above same, means associated with said second tower providing a film surface of fluid, duct means extending between said towers, means conveying fresh water at a temperature below that of said humidified air to said second tower to be disposed in flowing film attitude, and means bringing said humidified atmospheric air from said first tower through said duct means and into counterflow surface contact with the fresh water film surface in said second tower to induce dehumidification of the atmospheric air, thus to increase the volume of the fresh water.

6. A system according to claim 5, wherein means conduct the unevaporated saline water leaving said first tower and at least a portion of the fresh water leaving said second tower in heat exchange relation to raise the temperature of said unevaporated saline water and lower the temperature of said portion of the fresh water for reuse.

7. A method of converting saline water to fresh water comprising: heating saline water to be converted to a temperature above the wet bulb temperature of the atmosphere, disposing the heated saline water in thin film attitude, bringing atmospheric air into direct counterflow surface contact with the heated saline water in a zone thus to effect humidification of the air at atmospheric pressure and to cool the saline water, maintaining a supply of fresh water, disposing the fresh water in thin film attitude, bringing the fresh water and humidified air into direct counterflow surface contact at atmospheric pressure to effect dehumidification of the air to produce fresh water while raising the temperature of the fresh water, bringing the cooled saline water and heated fresh water into heat exchange relation to heat the saline water and cool the fresh water, recirculating the fresh water thus cooled to the first stage humidified air, and utilizing the saline water thus heated by the fresh water for effecting humidification of atmospheric air in a further direct contact zone.

8. In a system of the class described, means heating saline water to be converted to fresh water to a temperature above the wet bulb temperature of the ambient atmosphere, a first cooling tower, means associated with said tower providing a flowing film surface of fluid to be cooled, means conveying the heated saline water to said cooling tower to be disposed in flowing film attitude, means moving atmospheric air into counterflow surface contact with the film surface of water to cool same while effecting humidification of said atmospheric air, a second tower similar to the first, means associated with said second tower providing a film surface of fluid, means conveying fresh water at a temperature below that of said humidified air to said second tower to be disposed in flowing film attitude, means bringing said humidified atmospheric air from said first tower into counterflow surface contact with the fresh water film surface in said second tower to induce dehumidification of the atmospheric air, thus to increase the volume of fresh water, and heat exchange means cooling at least a portion of said fresh water and means recirculating said portion of fresh water through said second tower.

References Cited by the Examiner
UNITED STATES PATENTS

| | | | |
|---|---|---|---|
| 614,776 | 11/98 | Stocker | 202—163 |
| 1,920,682 | 8/33 | Saugy | 261—112 |
| 2,133,904 | 10/38 | Reichhold et al. | 261—112 |
| 2,372,846 | 4/45 | Nettel et al. | |
| 2,573,491 | 10/51 | Richardson | 261—112 |
| 2,760,764 | 8/56 | Orzel | 261—112 |
| 3,062,516 | 11/62 | Hickman | 261—112 |

HARRY B. THORNTON, *Primary Examiner.*

RONALD R. WEAVER, HERBERT L. MARTIN,
*Examiners.*